United States Patent
Boudier et al.

(10) Patent No.: US 11,584,188 B2
(45) Date of Patent: *Feb. 21, 2023

(54) STABILIZER ASSEMBLY FOR A VEHICLE

(71) Applicant: SOGEFI SUSPENSIONS, Guyancourt (FR)

(72) Inventors: Pascal Boudier, Vitry en Artois (FR); Touria Achtioui, Douai (FR); Jacky Rhein, Yerres (FR); Maud Villette, Vitry en Artois (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/635,587

(22) PCT Filed: Aug. 1, 2018

(86) PCT No.: PCT/FR2018/051977
§ 371 (c)(1),
(2) Date: Jan. 31, 2020

(87) PCT Pub. No.: WO2019/025726
PCT Pub. Date: Feb. 7, 2019

(65) Prior Publication Data
US 2020/0238784 A1    Jul. 30, 2020

(30) Foreign Application Priority Data

Aug. 2, 2017  (FR) ...................... 17 57412

(51) Int. Cl.
*B60G 21/055*  (2006.01)
*F16F 1/16*  (2006.01)

(52) U.S. Cl.
CPC ............ *B60G 21/0551* (2013.01); *F16F 1/16* (2013.01); *B60G 2202/135* (2013.01);
(Continued)

(58) Field of Classification Search
CPC ................... B60G 21/0551; B60G 2204/1222
See application file for complete search history.

(56) References Cited

U.S. PATENT DOCUMENTS 5,208,981 A * 5/1993 Puzsik ................... B60K 17/24
29/898.07
5,588,209 A * 12/1996 Fisher ..................... B29C 70/74
264/251

(Continued)

FOREIGN PATENT DOCUMENTS

DE  102012208156 A1 * 11/2013 ........... B60G 21/055
DE  102012208156 A1    11/2013
(Continued)

OTHER PUBLICATIONS

English language abstract of DE 102014217839.
(Continued)

*Primary Examiner* — Paul N Dickson
*Assistant Examiner* — Caitlin Anne Miller
(74) *Attorney, Agent, or Firm* — Victoria Bennett

(57) ABSTRACT

A stabilizer unit for a vehicle and a method for manufacturing such a stabilizer unit, the stabilizer unit comprising a stabilizer bar, at least one bearing including a flange, made of plastic material, including at least one retaining portion and one groove including a cradle portion, wherein the stabilizer bar passes through the groove of the flange and is secured to the flange by means of a vulcanized elastomer layer.

13 Claims, 2 Drawing Sheets

(52) U.S. Cl.
CPC ............... *B60G 2204/1222* (2013.01); *B60G 2204/418* (2013.01); *B60G 2206/427* (2013.01); *B60G 2206/71043* (2013.01); *B60G 2206/73* (2013.01); *B60G 2206/8207* (2013.01)

(56) References Cited

U.S. PATENT DOCUMENTS

| | | | |
|---|---|---|---|
| 2012/0097827 A1* | 4/2012 | Klink | B60G 21/0551 248/635 |
| 2018/0141402 A1* | 5/2018 | Oh | B60G 21/0551 |
| 2020/0376917 A1* | 12/2020 | Ditzel | B60G 21/0551 |
| 2021/0122207 A1* | 4/2021 | Baudelet | B60G 21/0551 |

FOREIGN PATENT DOCUMENTS

| | | | | |
|---|---|---|---|---|
| DE | 202016100149 U1 * | 2/2016 | | B60G 21/0551 |
| DE | 202016100149 U1 | 2/2016 | | |
| DE | 102014217839 A1 * | 3/2016 | | F16F 1/3842 |
| DE | 102014217839 A1 | 3/2016 | | |
| DE | 102015008952 B3 | 7/2016 | | |
| EP | 1124076 A2 | 8/2001 | | |
| EP | 3326846 A1 | 5/2018 | | |
| WO | 2010/149756 A1 | 12/2010 | | |
| WO | 2012/038659 A1 | 3/2012 | | |
| WO | WO-2012038659 A1 * | 3/2012 | | B62D 21/11 |
| WO | WO-2019025741 A1 * | 2/2019 | | B60G 21/0551 |

OTHER PUBLICATIONS

English language abstract of DE 202016100149.
English language abstract of WO2012/038659.
English language abstract of DE 102015008952.
English language abstract of DE 102012208156.
English language abstract of EP 1124076.

* cited by examiner

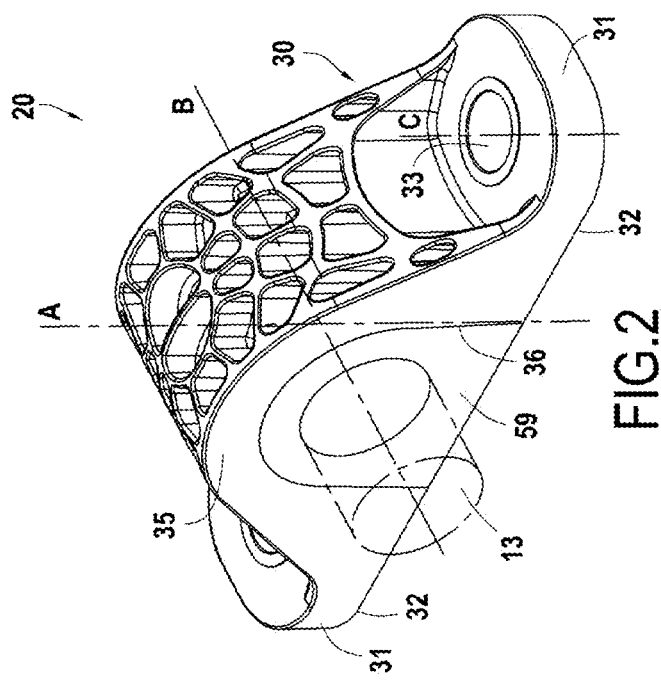
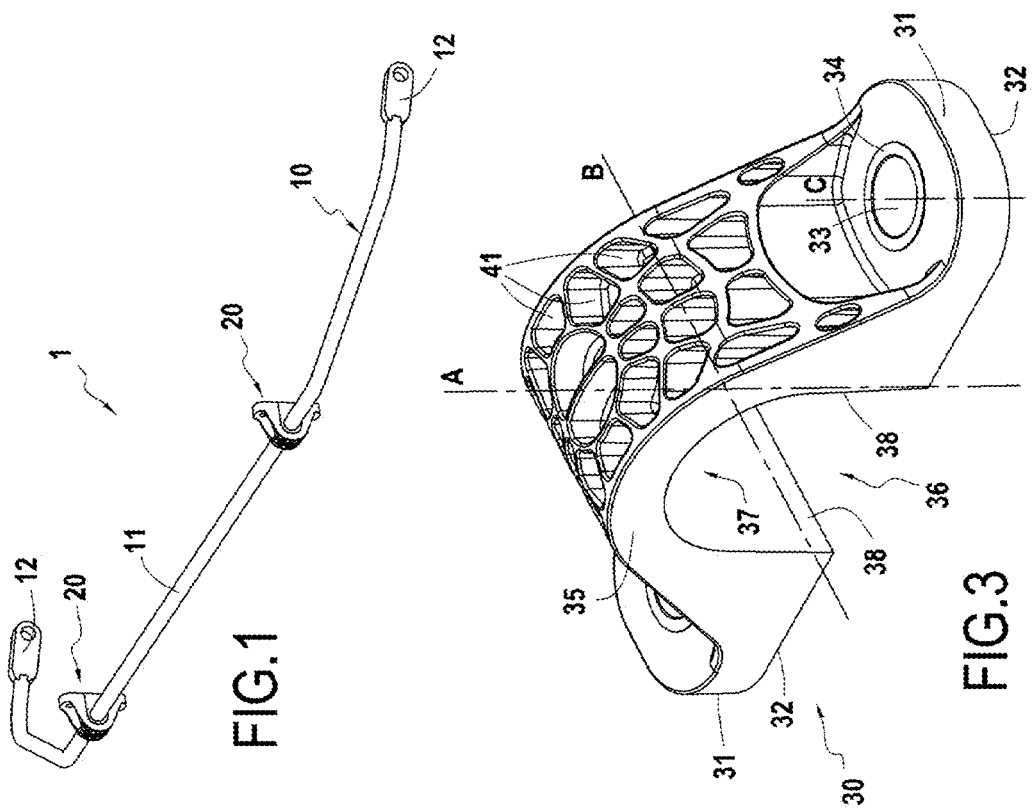

STABILIZER ASSEMBLY FOR A VEHICLE

FIELD

The present disclosure relates to a stabilizer unit for a vehicle and to a method for manufacturing such a stabilizer unit.

Such a stabilizer unit may be suitable for any type of stabilizer bar and any type of vehicle, in order to limit the roll of the vehicle. Particularly, such a stabilizer unit may be used for any axle of the vehicle.

BACKGROUND

In a vehicle with axles, the two wheels on the same axle are generally connected by a stabilizer bar. Such a stabilizer bar, also called an anti-sway or anti-roll bar, is a suspension element of the vehicle that forms a spring tending to secure the two wheels of the same axle. Such a stabilizer bar thus makes it possible to limit the roll during turns and reduce the deformations undergone by the suspension so as to keep the tires flat on the ground as much as possible and therefore maintain maximum grip.

Each end of a stabilizer bar is thus fastened to the wishbone of a wheel, by means of ball-joint tie rods, while the central portion of the stabilizer bar is fastened to the chassis of the vehicle by means of at least two bearings.

These bearings must allow the fastening of the stabilizer bar on the chassis of the vehicle while ensuring a certain flexibility, the stabilizer bar being able to slightly move relative to the chassis.

For this reason, the bearings conventionally comprise a metal flange and an elastic ring interposed between the stabilizer bar and the metal flange. This elastic ring, most often made of elastomer, is thus generally placed around the stabilizer bar and then clamped by the flange that then blocks it by compression.

However, such metal flanges are quite heavy and relatively expensive. In addition, in some known configurations, the stabilizer bar may slide relative to the bearings, thereby generating undesirable noise.

There is therefore a real need for a stabilizer unit for a vehicle as well as a method for manufacturing a stabilizer unit which are devoid, at least partly, of the drawbacks inherent in the aforementioned known configurations.

SUMMARY

The present disclosure relates to a stabilizer unit for a stabilizer bar of a vehicle, including a stabilizer bar, at least one bearing including a flange, made of plastic material, including at least one retaining portion and one groove including a cradle portion, in which the stabilizer bar passes through the groove of the flange and is secured to the flange by means of a vulcanized elastomer layer.

In the present disclosure, it is meant by "elastomer layer" a layer composed of at least 50%, preferably at least 80%, more preferably at least 99%, of one or several elastomer(s).

Thanks to the use of plastic materials, it is possible to drastically reduce the mass of the bearing compared to the case of a metal bearing while keeping equivalent mechanical properties. It is thus possible to obtain a mass gain of at least 40% compared to a metal bearing.

In addition, since the elastomer layer secures the stabilizer bar to the flange, the stabilizer bar may not slide relative to the flange, which reduces the noise generated by the bearing.

In some embodiments, the bearing further comprises a shim, made of plastic material, engaged at least partially in the groove of the flange, including a cradle portion, the stabilizer bar being secured to the shim by means of said vulcanized elastomer layer. However, such a shim is in no way necessary and will be preferably omitted.

In some embodiments, the flange is made from a thermoplastic material, preferably from polyamide, for example from PA66. This lightweight material gives good mechanical properties. It also offers good adhesion with the elastomer layer. The flange may also be made from polybutylene terephthalate (PBT), in particular.

In the present disclosure, it is meant that a given part is made "from" a particular material when it is composed of at least 60%, preferably at least 80%, more preferably at least 99%, of the considered material.

Similarly, in some embodiments, the shim is made of thermoplastic material, preferably from polyamide, for example from PA66. The flange may also be made from polybutylene terephthalate (PBT), in particular.

In some embodiments, the flange is made in a fiber-reinforced material. These fibers allow reinforcing the mechanical strength of the flange.

Similarly, in some embodiments, the shim is made in a fiber-reinforced material.

In some embodiments, the fibers are glass fibers.

In some embodiments, the fibers are short fibers of length less than 5 mm, preferably comprised between 2.5 and 3.5 mm.

In some embodiments, the diameter of the fibers is comprised between 0.1 and 0.5 mm, preferably comprised between 0.2 and 0.3 mm.

In some embodiments, the fibers are sized.

In some embodiments, the elastomer layer is made from vulcanized rubber.

In some embodiments, the elastomer layer extends completely around the stabilizer bar. In this manner, the stabilizer bar may move in all directions within the flange and be effectively returned to its rest position. Preferably, the elastomer layer is continuous all around the stabilizer bar.

In some embodiments, the elastomer layer occupies the entire volume of the groove left by the stabilizer bar, or the volume of the groove left by the stabilizer bar and the shim when such a shim is present, preferably in one piece in a continuous manner. This, on the one hand, facilitates the manufacture of the elastomer layer and, on the other hand, allows better compression of the stabilizer bar.

In some embodiments, the groove of the flange has a U-shape with planar side walls extending from the cradle portion, said cradle portion being semi-cylindrical. This configuration makes it possible to easily place the stabilizer bar and allows good transmission of the forces exerted on the bar; it also facilitates the assembly with the shim.

A bearing in which the groove of the flange has a U shape with planar side walls extending from the cradle portion, said cradle portion being semi-cylindrical.

In some embodiments, the flange comprises two fastening tabs, forming retaining portions, framing the groove and each provided with a bore.

In some embodiments, the bore of at least one retaining tab is provided with a metal sleeve. This makes it possible to strengthen the bore area so that the fastening of the bearing on the chassis of the vehicle does not weaken.

In some embodiments, the shim has a geometry complementary to the geometry of an end portion of the groove of the flange.

In some embodiments, the surface of the shim opposite its cradle portion is provided to be flush with an abutment surface of the flange. The chassis of the vehicle thus exerts a compression force on the shim, and therefore on the stabilizer bar, when the bearing is fastened on the chassis.

In some embodiments, the flange comprises a guide member configured to guide the shim in translation within the groove. This facilitates the assembly of the bearing and ensures the correct positioning of the shim relative to the flange, while allowing a relative movement of translation between the shim and the flange.

In some embodiments, the flange has a guide slot configured to receive and guide a guide rib of the shim. However, the reverse configuration is also possible.

In some embodiments, the flange and the shim have elastic nesting members configured to secure the shim in the groove of the flange. These elastic nesting members allow maintaining the assembly of the shim and of the flange and maintaining the compression exerted by these elements on the stabilizer bar.

In some embodiments, the flange has elastic tabs configured to be engaged and retained behind shoulders of the flange. However, the reverse configuration is also possible.

In some embodiments, the flange has a cellular structure. Such a cellular structure allows reducing the amount of material used and thus further reducing the mass of the bearing.

In some embodiments, the cells of the flange are parallel and extend along a main direction of the flange orthogonal to the direction of extension of the stabilizer bar. In this manner, the side walls of the cells extend in the main direction of the flange, that is to say the direction of fastening of the bearing and the direction of compression of the stabilizer bar: a better distribution of the stresses is thus obtained.

In some embodiments, at least some walls separating the cells of the flange extend in substantially radial and/or tangential planes with respect to the main axis of the flange. This orientation allows ensuring good mechanical strength of the flange towards the compression forces.

In some embodiments, at least some walls separating the cells of the flange extend in substantially radial and/or tangential planes relative to the axis of a bore of the flange. This orientation makes it possible to ensure good mechanical strength of the flange at this bore, particularly towards the fastening forces.

In some embodiments, each wall separating two cells of the flange extends in a substantially radial plane or a substantially tangential plane with respect to the main axis of the flange or to the axis of a bore of the flange.

In the case of a fiber-reinforced material, it should also be noted that these cells allow orienting the fibers along the walls separating the cells and therefore reinforcing the flange in these same structural planes.

In some embodiments, fillets are provided between each side wall of the cells of the flange. These fillets facilitate the flow of the fluid in the mold during the injection. In the case of a fiber-reinforced material, they also promote the passage of the fibers and their orientation along the walls.

Similarly, in some embodiments, the shim has a cellular structure.

In some embodiments, the cells of the shim are parallel and extend along a main direction of the shim orthogonal to the direction of extension of the stabilizer bar. In this manner, the side walls of the cells extend in the main direction of the shim, that is to say the direction of insertion of the shim into the flange and the direction of compression of the stabilizer bar: the shim thus maintains good mechanical strength despite the presence of the cells.

In some embodiments, at least some walls, and preferably all the walls, separating the cells of the shim extend in substantially radial and/or tangential planes with respect to the main axis of the shim.

In some embodiments, fillets are provided between each side wall of the cells of the shim.

In some embodiments, the stabilizer bar is a solid bar or a hollow tube.

In some embodiments, the stabilizer bar is painted.

In other embodiments, the stabilizer bar is devoid of paint.

In some embodiments, the surface tension of the stabilizer bar at the bearing is greater than 60 mN/m, preferably greater than 70 mN/m.

The present disclosure also relates to a method for manufacturing a stabilizer unit for a vehicle, comprising the following steps: providing a stabilizer bar; providing a flange, made of plastic material, including at least one retaining portion and one groove including a cradle portion; placing the stabilizer bar in the groove of the flange; injecting an elastomer into the groove of the flange, at the interface with the stabilizer bar, and obtaining an elastomer layer at this interface; vulcanizing said elastomer layer.

In some embodiments, the flange is made by molding and injection.

In some embodiments, the stabilizer bar undergoes a flame treatment before the injection of the elastomer, this flame treatment taking place at least in the area provided for this injection. Such a step is particularly suitable when the stabilizer bar is painted. Indeed, this flame treatment makes it possible to increase the surface tension of the stabilizer bar so as to ensure better adhesion of the elastomer layer on the stabilizer bar.

In some embodiments, this flame treatment is carried out without the surface temperature of the stabilizer bar exceeding 100° C.

In some embodiments, the duration of this flame treatment is comprised between 2 and 10 s, preferably between 4 and 8 s.

In some embodiments, the stabilizer bar is driven in rotation about its main axis during this flame treatment step.

In some embodiments, the elastomer injection step is performed less than 4 hours after the flame treatment step.

The above characteristics and advantages, as well as others, will become apparent upon reading the following detailed description of exemplary embodiments of the stabilizer unit and of the proposed method. This detailed description refers to the appended drawings.

BRIEF DESCRIPTION OF THE DRAWINGS

The appended drawings are schematic and are primarily intended to illustrate the principles of the disclosure.

In these drawings, from one figure (FIG.) to the other, identical elements (or portions of elements) are identified by the same reference signs. In addition, elements (or portions of elements) belonging to different exemplary embodiments but having a similar function are identified in the figures by numerical references incremented by 100, 200, etc.

FIG. 1 is a perspective view of a stabilizer unit.
FIG. 2 is a perspective view of one example of a bearing.
FIG. 3 is a perspective view of the flange of FIG. 2.

DETAILED DESCRIPTION

Figure 4:
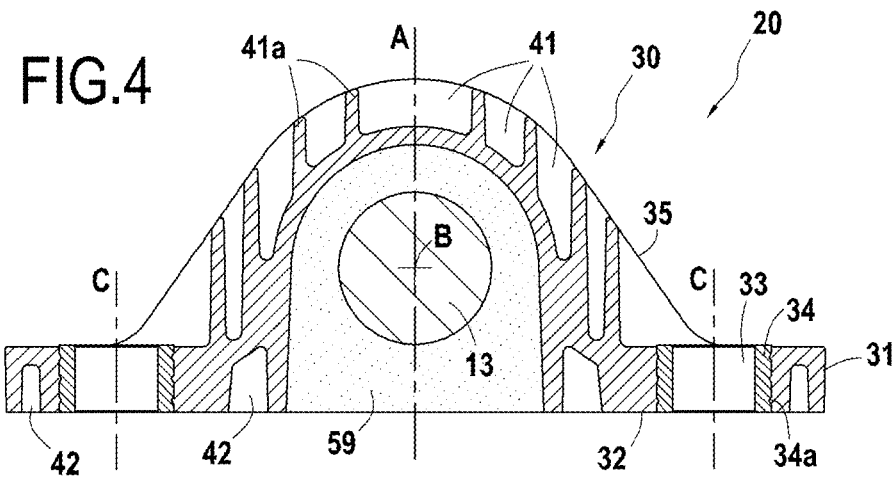
FIG. 4 is a sectional view of the bearing of FIG. 2.

In order to make the disclosure more concrete, one example of a stabilizer unit is described in detail below, with reference to the appended drawings. It is recalled that the disclosure is not limited to this example.

FIG. 1 represents a stabilizer unit 1 for a vehicle comprising a solid or hollow stabilizer bar 10, painted or not, whose central portion 11 is equipped with two bearings 20. The bearings 20 are intended to be fastened on the chassis of the vehicle while the ends 12 of the stabilizer bar 10 are intended to be fastened on portions of the vehicle that are secured to each wheel of the same axle, particularly the wishbone of each wheel of the axle.

FIGS. 2 to 6 represent such a bearing 20 mounted on a section 13 of the stabilizer bar 10. The bearing 20 comprises a flange 30 and an elastomer layer 59.

The flange 30 has a general U shape and comprises two retaining tabs 31 connected by an arch 35 so as to form a groove 36. The flange 30 is symmetrical with respect to its main axis A which more broadly constitutes the main axis of the bearing 20.

Each retaining tab 31 extends laterally from the base of the arch 35, perpendicularly to the main axis A. Each retaining tab 31 has an abutment surface 32, forming the abutment surface of the flange 30 and more broadly of the bearing 20, and a through bore 33, of axis C perpendicular to the abutment surface 32 and therefore parallel to the main axis A. Each bore 33 is provided with a metal sleeve 34.

The generally U-shaped groove 36, is also symmetrical with respect to the main axis A. It has a semi-cylindrical bottom portion, forming a cradle portion 37, flanked by two planar side walls 38 opening onto the abutment surface 32 of the flange 30. The semi-cylindrical cradle portion 37 is directed along an axis B orthogonal to the axis A and corresponding to the direction of extension of the stabilizer bar 10 when the bearing 20 is mounted.

The flange 30 is made by glass fiber-reinforced polyamide 66 molding and injection. These glass fibers are short fibers with a length comprised between 3 and 3.2 mm for a diameter comprised between 0.2 and 0.25 mm. These fibers are treated by sizing to allow proper wetting of the fibers and then mixed with the polyamide matrix at a level of 30 to 50% by mass of the final material. The metal sleeves 34 are for their part inserted into the mold of the flange 30 before the injection of the thermoplastic material; annular reliefs 34a allow blocking their positions within the flange 30 once the material has solidified.

Figure 5:
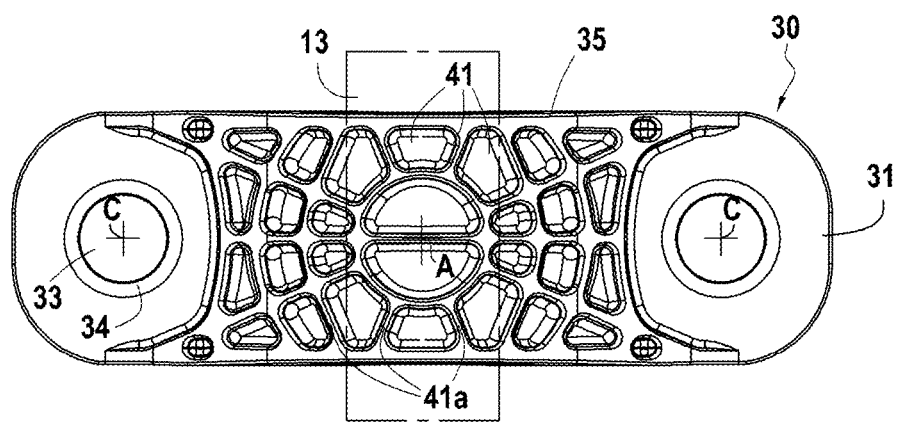
FIG. 5 is a top view of the bearing of FIG. 2.
Figure 6:
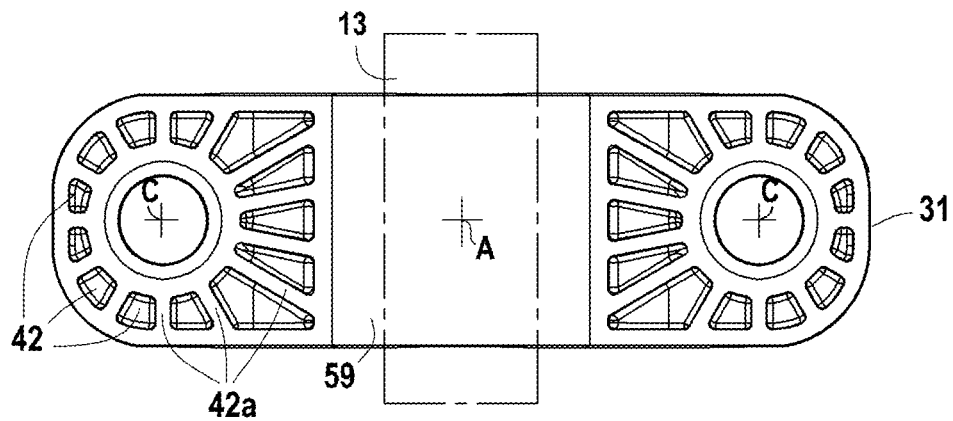
FIG. 6 is a bottom view of the bearing of FIG. 2.

As better seen in FIGS. 5 and 6, the flange 30 includes many cylindrical cells 41, 42 extending parallel to the main axis A of the flange 30. The arch 35 includes a first set of cells 41 organized symmetrically with respect to the main axis A. Particularly, the walls 41a separating these cells 41 extend either radially with respect to the main axis A or along curves centered on the main axis A and preferably substantially circumferential with respect to the main axis A. These cells 41 are open on the external surface of the arch 35 and closed at the groove 36. In addition, the corners of these cells 41 are rounded, a fillet being provided between each side wall of the cells 41, so as to facilitate the passage and the orientation of the reinforcing fibers in the flange 30 during the injection.

Each retaining tab 31 also includes a second set of cells 42 organized symmetrically with respect to the axis C of the bore 33 of the considered retaining tab 31. Particularly, the walls 42a separating these cells 42 extend radially with respect to the axis C of the bore 33. These cells 42 are open on the abutment surface 32 of the retaining tab 31 and closed at its opposite surface. Here again, the corners of these cells 42 are rounded, a fillet being provided between each side wall of the cells 42.

The stabilizer unit 1 is then assembled in the following manner. Once the flange 30 is manufactured by molding and injection, the flange 30 is passed around the stabilizer bar 10. Particularly, it is noted in FIGS. 2 and 4 that the section 13 of the stabilizer bar 10 is received entirely in the groove 36 of the flange 10, that is to say that the groove 36 completely surrounds the stabilizer bar 10.

The stabilizer bar 10 may have undergone a preparation treatment. Particularly, the stabilizer bar 10 may have undergone a flame treatment step during which the area(s) which are to receive the bearing 20 are heated locally for about 6 s using a torch flame, for example a gas, propane, butane or acetylene torch to mention a few examples. During this flame treatment step, the bar is turned around its axis, for example by hand.

This unit is then placed in a mold so that the stabilizer bar 10 extends within the flange 30 along the axis B, leaving a continuous and constant clearance between the stabilizer bar 10 and the cradle portion 37 of the flange 30.

Rubber is then injected into the mold so as to fill the space in the groove 63 left all around the stabilizer bar 10, thus forming the elastomer layer 59. Thus, as can be seen in FIG. 4, it is understood that the elastomer layer 59 completely surrounds, in one piece in a continuous manner, that is to say in a single portion without breaks, the section 13 of the stabilizer bar 10. The elastomer layer 59 thus obtained is then vulcanized so as to secure the stabilizer bar 10 within the flange 30: the bearing 20 is thus assembled and the same operation may be carried out for the second bearing 20.

The stabilizer unit 1 thus assembled may then be mounted on the chassis of the vehicle by pressing the abutment surface 32 of the bearing 10 on the chassis and by screwing the bearing 20 on the chassis using two screws passing through the bores 33 of the retaining tabs 32.

Although the present disclosure has been described with reference to specific exemplary embodiments, it is obvious that modifications and changes may be made to these examples without departing from the general scope of the disclosure as defined by the claims. Particularly, individual characteristics of the various illustrated/mentioned embodiments may be combined in additional embodiments. Consequently, the description and the drawings should be considered in an illustrative rather than restrictive sense.

It is also obvious that all the characteristics described with reference to one method may be transposed, alone or in combination, to one device, and conversely, all the characteristics described with reference to one device may be transposed, alone or in combination, to one method.

The invention claimed is:

1. A stabilizer unit for a vehicle, comprising:
   a stabilizer bar,
   at least one bearing including a flange, made of plastic material, including at least one retaining portion and one groove including a cradle portion,
   wherein the stabilizer bar passes through the groove of the flange and is secured to the flange by an injected and vulcanized elastomer layer, the elastomer layer being configured to adhere directly to the stabilizer bar and to completely surround the stabilizer bar in one piece, in a continuous manner, without breaks, and
   the stabilizer bar is heat-treated.

2. The stabilizer unit according to claim 1, wherein the flange is made of thermoplastic material, preferably from polyamide.

3. The stabilizer unit according to claim 1, wherein the flange is made in a fiber-reinforced material.

4. The stabilizer unit according to claim 1, wherein the elastomer layer is made from vulcanized rubber.

5. The stabilizer unit according to claim 1, wherein the elastomer layer occupies the entire volume of the groove left by the stabilizer bar.

6. The stabilizer unit according to claim 1, wherein the flange has a cellular structure.

7. The stabilizer unit according to claim 6, wherein the cells of the flange are parallel and extend along a main direction of the flange orthogonal to a direction of extension of the stabilizer bar.

8. The stabilizer unit according to claim 7, wherein at least some walls separating the cells of the flange extend in substantially radial and/or tangential planes with respect to a main axis of the flange.

9. The stabilizer unit according to claim 6, wherein fillets are provided between each side wall of cells of the flange.

10. The stabilizer unit according to claim 6, wherein the corners of cells of the flange are rounded.

11. A Method for manufacturing a stabilizer unit for a vehicle, comprising the following steps:
providing a stabilizer bar;
heat-treating the stabilizer bar;
providing a flange, made of plastic material, including at least one retaining portion and one groove including a cradle portion;
placing the stabilizer bar in the groove of the flange;
injecting an elastomer into the groove of the flange, at the interface with the stabilizer bar, and obtaining an elastomer layer adhered directly to the stabilizer bar at this interface, the elastomer layer completely surrounding the stabilizer bar in one piece, in a continuous manner, without breaks;
vulcanizing said elastomer layer.

12. The method according to claim 11, wherein providing the flange includes the flange having a cellular structure and each cell including rounded corners.

13. The method according to claim 11, wherein providing the flange includes the flange having a cellular structure including fillets between each side wall of cells of the flange.

* * * * *